Aug. 20, 1935. J. W. WOODRUFF 2,012,031
HIGH PRESSURE GREASING CONTROL VALVE
Filed Nov. 25, 1932
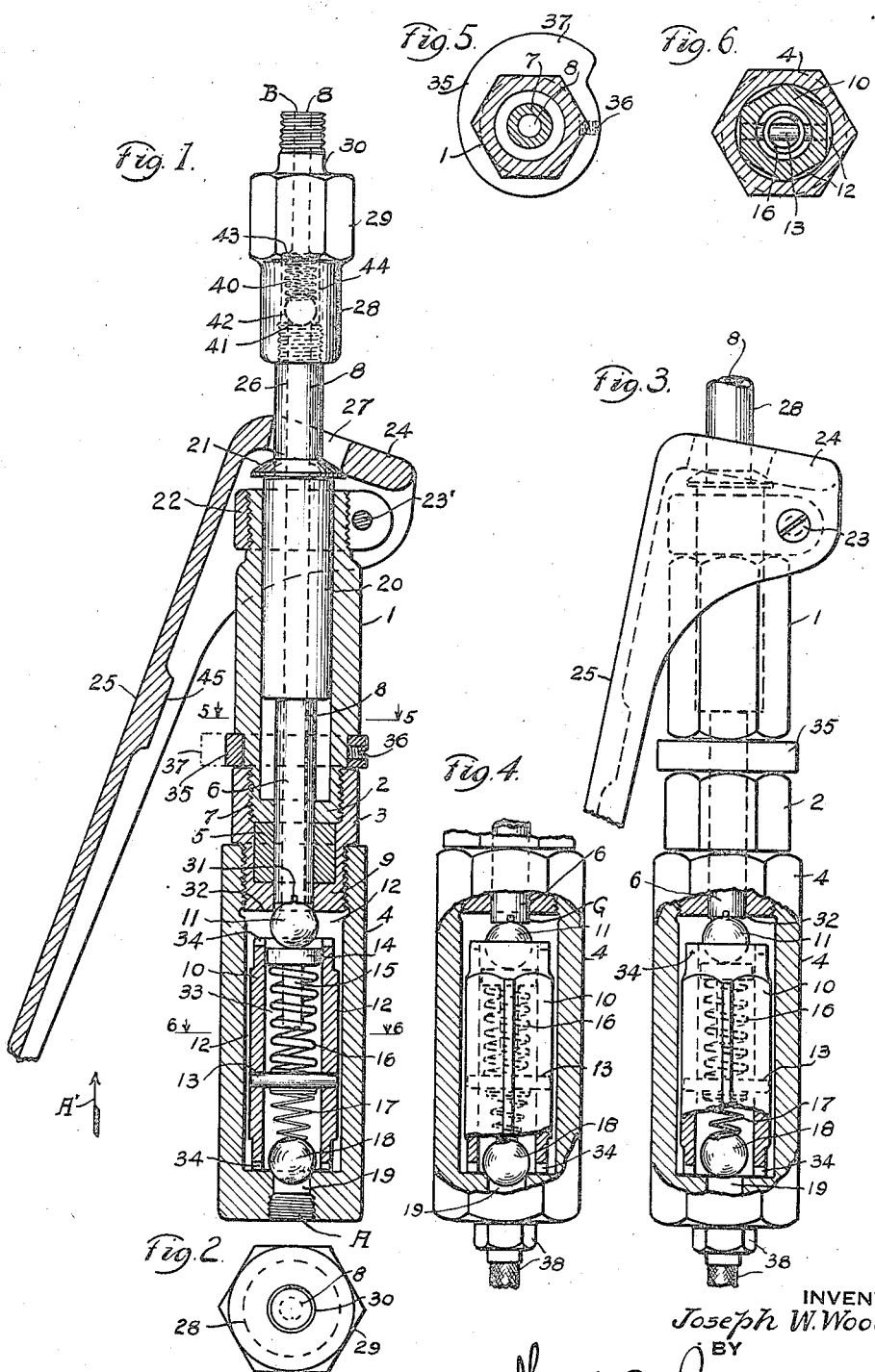
INVENTOR-
Joseph W. Woodruff.
BY
Harold D. Penney ATTORNEY- Patented Aug. 20, 1935

2,012,031

UNITED STATES PATENT OFFICE 2,012,031

HIGH PRESSURE GREASING CONTROL VALVE

Joseph W. Woodruff, Elizabeth, N. J.

Application November 25, 1932, Serial No. 644,288

6 Claims. (Cl. 221—47.3)

The present invention relates to an improvement in manually operable pressure grease guns or cut-off valves, and has for its principal object the provision of a cut-off valve for vehicle or similar greasing systems in which the grease is put under abnormal pressures in tanks or drums, and is fed through connecting ducts to the joints, bearings and shackles of vehicles, under pressure, said duct being connected mechanically to the said joints, etc., by customary connecting fittings.

Between the source of grease under pressure and the joint connecting fittings, the present valve may be connected, to cut off the grease flow, or to release it, as required.

The present valve therefore acts as a control for the grease flow. It further, has another feature of importance, and this latter feature relates to an added means provided in the control valve, whereby when the greasing connector is connected to a joint, it may be operated to clear out the old grease and force through a fresh charge of grease, and if it meets with a resistance, due to the caking of the prior charge of grease therein, the caked prior charge may be "cracked" or opened by manipulating the present control valve to boost the pressure on the grease to much higher pressures than the normal tank pressures therein, and thereby force the higher pressure to break down the dried, caked grease which has sealed the joint or bearing against normal operation by the said tank pressures.

To illustrate; it has been found that in automobiles, the shackle connections between the springs and the unsprung weight of the vehicle often become badly caked and hard, so that it is impossible to force grease through such shackle bearings by the grease under normal tank pressures. After connecting the grease duct fitting not shown, from the control valve herein, to the coacting fitting on the shackle bearing, and opening the valve, the grease from the pressure grease tank flows to the shackle bearing but is unable to force its way through the bearing to clear out and replace the old grease, by reason of the old grease having caked and hardened, then by manipulating the handle of the control valve several times, a small increment of grease is forced, at a higher pressure than the tank pressure, into the shackle joint, until the caked up seal around the joint is broken and the grease flows freely, at tank pressure, through the joint.

Other features of advantage, relate to the sturdiness of the valve structure, its simplicity, means for regulating, by adjustment, for the amount of boosting stroke and flow control of the grease.

It will be obvious from the herein description that modifications may be made in the structure hereof without departing from the spirit hereof or the scope of the claims.

In the drawing:

Fig. 1 is a view in elevation, assembled, of the control valve with a part thereof in longitudinal axial section to better show the details thereof;

Fig. 2 is a top view, looking down, of Fig. 1;

Fig. 3 is a fragmentary view similar to Fig. 1 showing the component parts in action;

Fig. 4 is another fragmentary view, somewhat similar to Figs. 1 and 3, showing the pressure boosting action of the parts;

Fig. 5 is a sectional view taken on the line 5—5 looking in the direction of the arrow; and Fig. 6 is a sectional view taken on line 6—6, Fig. 1, looking in the direction of the arrows.

In Fig. 1, the complete control valve is shown, at its lower inlet end A it is attached by the threads there shown to a threaded duct connection from a source of grease or lubricant under pressure, these latter features being well known and understood, and forming no part of the present invention, are not shown.

The top or outlet end B, Fig. 1 is also shown threaded to receive thereon a threaded flexible duct on the opposite end of which is connected a bayonet connector for connecting the duct to a coacting lubricating nipple on the joint or bearing of an automobile or the like, this latter duct connection means being also well known, is also not shown.

The structure of the control valve, in the present instance, is preferably made up of parts threadedly connected to one another and they are as follows: the body portion 1, Fig. 1, is made of hexagonal metal, is threaded at its upper end to receive thereon a split and threaded collar 22, the split end being bored and threaded to receive therethrough a binding screw which clamps the collar 22 to the threaded end of body 1, and also acts as a pivotal support by reason of its head 23 and its opposite unthreaded end 23' shown in section in Fig. 1, thereby to pivotally support the manually operable handle 25, shown in section. The lower end of the handle when the valve is in closed position, lies at an angle to the main valve structure and is normally so held by means to be later described.

The body 1 is bored to reciprocably mount therein a cylindrical plunger, having an externally located portion 26 to which is threadedly attached a nipple 29 by its threaded end 28. The mid-portion 20 of the plunger is of larger diameter than its ends 26 or 6. The lower end 6 passes through a bore in the shoulder 2 of the body 1, a packing 5, and a second bore in a shoulder 9 of the threaded hex fitting 3. This latter fitting has a recessed bored and threaded portion 7, into which the lower threaded end of body 1 is tightly screwed upon the packing 5, and the lower end of the hex fitting 3 has a reduced threaded end which, in turn fits into the upper threaded end lower hex body forming portion 4. The lower hex body portion 4 is recessed nearly its entire length as at 12, and terminates in a threaded bored shoulder as at 19, and constitutes the grease inlet port A.

The recess 12 in body 4, has loosely mounted therein a hex sectional bored sleeve 10, with turned and reduced ends, slots 34 being transversely cut across said ends, the fit of the said sleeve 10, in the recess 12, in body 4, being fully shown in Fig. 6.

Across the bore of sleeve 4 is fixedly mounted a support pin 13 upon the upper face of which rests a coiled spring 16, and against the lower face of which rests a coiled spring 17, of lesser power than spring 16. Spring 17 rests upon and normally maintains a valve ball 18, in normal closing position upon the valve edge or seat of bore 19.

Spring 16, normally supports a pressure, ball supporting disc 14, the lower cylindrical stem 15 of which rests within the coils of spring 16, and keeps disc 14 in operative position. A valve ball 11, normally under upward pressure of spring 16 is seated on an edge valve seat 32, formed by the bore in shoulder 9, and in addition, the ball 11, in its upward pressed position contacts with the edge of the bore 8, which runs completely through the plunger member 6—20—26 and the extension of which continues on up through fitting 29 and its nipple end 30, thus constituting a grease channel through to grease outlet B.

In Fig. 1, at the interior of the threaded nipple 29, is a recessed portion 44, into which is mounted a valve ball 42, shown dotted, which ball rests upon the valve edge 41, of the threaded end of extension end 26, and a coiled spring 40, resting upon ball 42, with its other end resting upon the shoulder 43 of the nipple 29, normally maintains said ball 42 to close the end of duct 8, at the terminal of extension 26, of the plunger body 20.

The lower extension 6 of plunger 20 at its lower end has a small slot 31 traversing its front edge, for purposes later to be described.

At the upper end of the plunger body 20, and on the shoulder formed between the junction of said body and extension 26, is located a curved face pressure ring 21, which coacts with the underside of the adjacent fulcrum face 24 of the handle 25, said fulcrum face being bored as at 27 to permit the extension therethrough of extension 26. Thus, when the handle 25 is pressed towards the body 1, the cylinder 20 and its appurtenant parts are likewise moved, and these parts are all normally kept in the positions shown in Fig. 1 by the spring 16.

In order to permit adjustable limitations of the handle 25, in order to stop its end stroke at a desired point, a cam 35, lockable by a set screw 36, is rotatably mounted on body 1 and is adjustable, so that its cam face 37 may be brought around to coact with stop 45, on the handle, for the desired limitations of movement.

As the control valve setting is shown in Fig. 1, the grease, under pressure, is stopped from passing through the valve by reason of the normal seating of the ball valve 11, upon its edge seat 32 on shoulder 9, when the handle is up.

When it is desired to pass grease through the control valve to a connected vehicle fitting, a slight inward movement of the handle 25, as in Fig. 3, forces ball 11 off its seat, and the grease, usually under from 100 to 400 lbs. pressure, pushes ball 18 from its seat, flows around the outside of the hex member 10, and up to and past ball 11, through the traverse slot 31, which is cut in the face of the end of extension 6, thence up through duct 8, displacing ball valve 42 off its seat, and thence through nipple 29, to the vehicular joint.

So long as the joints or bearings being greased are free and uncaked, the greasing progresses in the usual manner.

However, as soon as a bearing or joint is met with, wherein the grease cannot flow freely through and the flow thereof is stopped, the pressure of the grease within the device becomes balanced, automatically. Thereupon, the valve ball 18, goes back to its seat closing port 19, and valve ball 42 also goes back on its seat preventing grease already in the joint or bearing from back flowing. If, when the pressure flow of grease is thus stopped, the handle is released, the control valve is then filled with grease under considerable pressure, with balls 11, 18 and 42 reseated in their respective seats.

After this action, the handle 25 is pressed, or squeezed, downwardly its full amount of movement, only limited by the setting of adjustable stop cam 35, the plunger 6 is then forced into the recess 12 forcing ball 11, and the member 14, downwardly as in Fig. 4, thus displacing an amount of grease which is in proportion to the inward movement of the plunger 6, as at G, Fig. 4, and the grease under pressure being trapped by seated valve ball 18, has its pressure enormously increased, this pressure being added to the original pressure of the grease, causes a small increment of grease to pass the channel 31 over ball 11, and from thence through duct 8 to the joint. Thus a high pressure, hydraulic action is created upon the grease. If one booster stroke is not sufficient, several more, or as many strokes may be given, as required, thus to break the caked seal of the joint or bearing being greased. After the seal is broken, the grease flows normally through the control booster valve in the usual manner.

Having thus described my invention, what I claim is:

1. A grease flow control means for connection into a high pressure greasing line, comprising in combination a booster valve having aligned means on its ends for connecting the same into said line, said valve having a passage therethrough from end to end, a reciprocable piston in said passage having a grease duct therethrough, said duct being disposed in substantial axial relation with said passage manual means for moving said piston, one end of said plunger having a transverse grease passage cut across its face, a bored seat through which said end passes, a check valve on said seat to stop the flow of grease therethrough, means for automatically holding said check valve closed and to permit said check valve to be opened by said plunger end, a check valve on the opposite end of said plunger to pass grease therethrough when said first check valve is opened and means to automatically close said second check valve when said first valve is closed, a third check valve mounted at the inlet end of said booster valve, said third valve adapted to be opened when said first check valve is opened and said third check valve adapted also to be closed when said first check valve is opened, whereby, when said first check valve is opened grease will pass through said booster valve, but upon said grease flow meeting with resistance, both the second and third check valves will be automatically seated, thus trapping the grease within the confines of said booster valve, whereupon further reciprocation of the piston will force the trapped grease out of the outlet end under amplified pressure.

2. A control device for the dispensing line of a lubricating system comprising in combination a body including coacting members having aligned attaching ends, said body having a straight axial bore extending therethrough, a plunger mounted in said bore at one end of the body and having thereon a seat, said bore being adapted to communicate with the line at the opposite end of said body, said plunger having extending therethrough and coaxial with said bore a duct; a pivot carried by one side of said body adjacent said seat; said body providing a valve seat around its bore at the inner end of said plunger, a ball disposed on said valve seat, and an L-shaped lever having its short arm fulcrumed on the seat of said plunger, said arm having its outer end mounted on said pivot, the long arm of said lever being manipulable and disposed on the opposite side of said body adjacent thereto, so that said latter arm may be manually urged towards said body, whereby to move said plunger and displace the ball for dispensing the lubricant through said duct.

3. A control means for a pressure greasing line comprising in combination a hollow tubular body including an intake end and having means for attaching said end directly in the line, said body having a hand grip portion, a hollow tubular piston slidably mounted in the opposite end of said body and having a projecting discharge terminal, an annular seat rigid with said terminal, a pivot rod carried by one side of said body at said seat, a displaceable check valve normally closing the passages of said body and of said piston, said valve being disposed in closing relation on said body at the inner terminal of said piston, said latter terminal having therein a transverse slot, and an operating lever fulcrumed on said seat, said lever having one arm pivoted on said rod, and a manipulable arm on the opposite side of said body and spaced from said portion, whereby the latter may be manually gripped so as to draw said manipulable arm inwardly for sliding said piston to displace the check valve so that grease may flow through said slot and through the hollows of said members.

4. In a control apparatus for a lubricant supply line, the combination with a tubular body having a tubular piston reciprocally mounted therein, the bore of the piston being coaxial with the bore of said body, a valve at the inner end of said piston, spring means urging said valve to normally close the passages, said piston having an outer end including a fulcrum seat, said body having on one side thereof adjacent the seat a pivot pin; of a lever having a short arm fulcrumed on said seat, said arm having its outer end pivoted on said pin, a long arm disposed at right angles to the first arm and positioned on the opposite side of said body adjacent thereto, so that said long arm may be manually drawn into engagement with said body, whereby to urge said piston inwardly so as to displace said valve and open the passages.

5. In a control apparatus for a lubricant supply line, in combination, a tubular body having a tubular piston reciprocally mounted in its outlet end, the bore of said piston being coaxial with the bore of said body, said piston having an outer end including a fulcrum seat, means for attaching the inlet of said body and the outer end of said piston in the supply line, a valve at the inner end of said piston, spring means urging said valve to close said passages, said spring means also normally holding the piston in an outer position, said body having on one side thereof adjacent said seat a pivot pin; and a substantially L-shaped lever; said lever having the outer end of its short arm pivoted on said pin, and there being an opening in the inner end of said arm, the outer end of said piston being passed freely through said opening and the last mentioned inner end being fulcrumed on said seat; the long arm of said lever being disposed on the opposite side of said body adjacent thereto, so that said long arm may be manually drawn into engagement with said body, whereby to urge the piston inwardly against the action of said spring for displacing the valve to open said passages.

6. In a control apparatus for a lubricant supply line, the combination according to claim 5, together with adjustable means disposed between said body and said long arm, so that the inward movement of said long arm may be regulated to limit the inward movement of the piston.

JOSEPH W. WOODRUFF.